(No Model.) 2 Sheets—Sheet 1.
J. J. McCARTER.
PLOW FENDER.
No. 289,432. Patented Dec. 4, 1883.
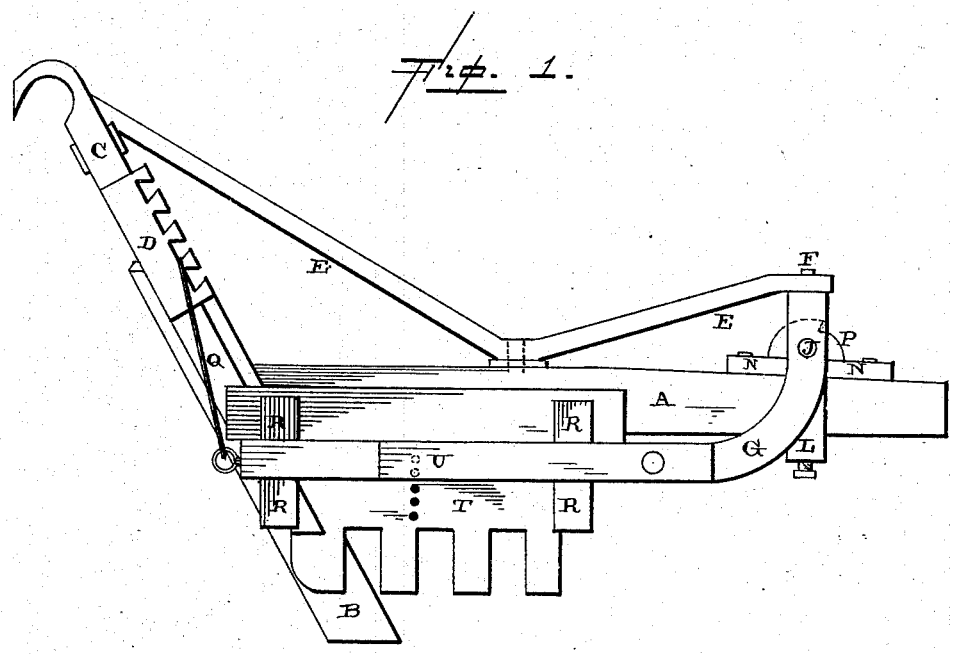
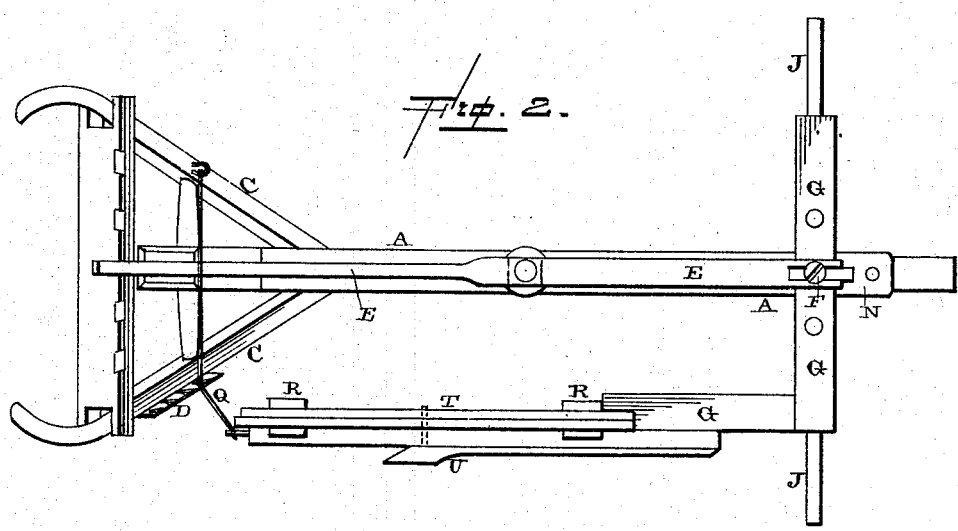
Witnesses:
Louis L. Gardner
J. W. Garner
Inventor:
J. J. McCarter,
per
F. A. Lehmann,
Atty

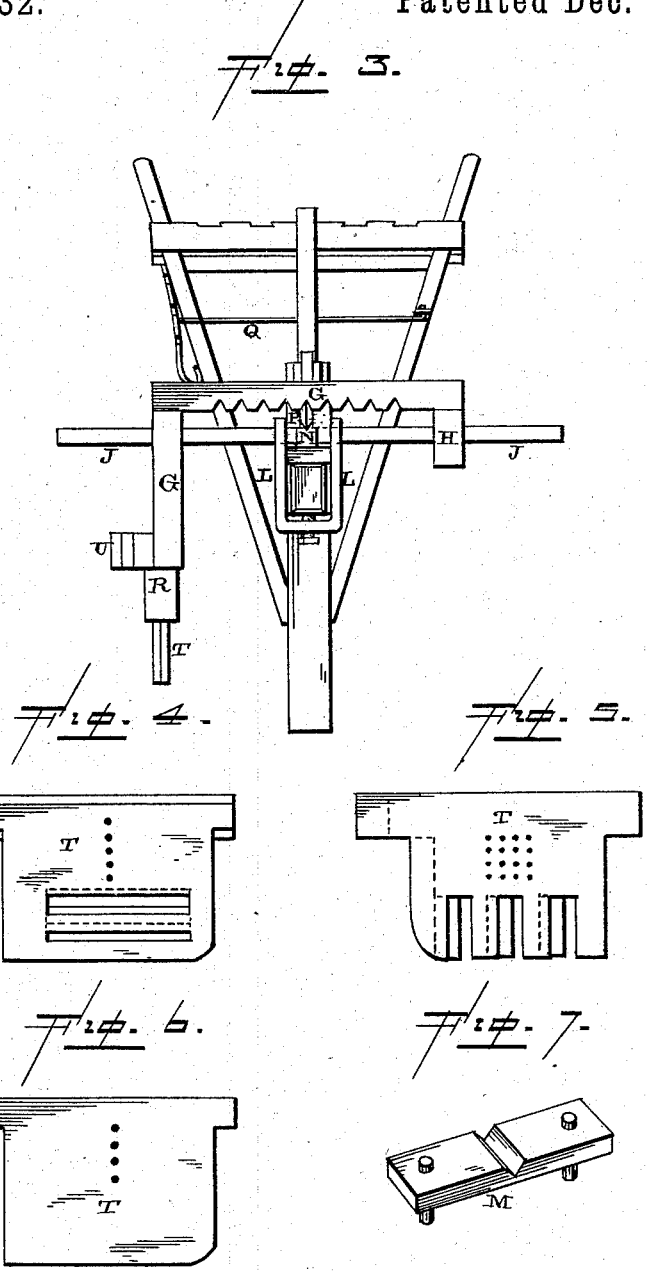

UNITED STATES PATENT OFFICE.

JOHN J. McCARTER, OF ORRWOOD, MISSISSIPPI.

PLOW-FENDER.

SPECIFICATION forming part of Letters Patent No. 289,432, dated December 4, 1883.

Application filed January 9, 1883. (No model.)

*To all whom it may concern:*

Be it known that I, JOHN J. MCCARTER, of Orrwood, in the county of Lafayette and State of Mississippi, have invented certain new and useful Improvements in Plow-Fenders; and I do hereby declare the following to be a full, clear, and exact description of the invention, such as will enable others skilled in the art to which it pertains to make and use it, reference being had to the accompanying drawings, which form part of this specification.

My invention relates to an improvement in fenders for plows and cultivators; and it consists, first, in the combination of the fender rod or bar, the pivotal rod upon which the fender turns, a block and stirrup, and operating rod or lever, by means of which the fender is shifted laterally; second, in the combination of an adjusting lever and ratchet with a fender-rod which extends across the top of the beam, and which is provided with a ratchet on its under side, with a block for holding the rod in any desired position, the block having a portion of its edge cut away, so that the fender, after having been raised upward at its rear end, can be shifted upon the block, and then automatically lock itself in place again when the lower end is dropped; third, in a combination of the fender-rod, which is provided with suitable guides or holders, and a suitable spring with the fenders, which are placed in the guides or holders, and which can be adjusted vertically, all of which will be more fully described hereinafter.

The object of my invention is to provide an apparatus by which the fenders can be adjusted nearer to or farther from the plow without having to stop the horse or to loosen a single bolt, and to so construct the fenders that they can be used together in pairs, and thus enlarge or decrease the openings through them, so as to regulate not only the amount of earth that shall be thrown toward the plants, but the size of the lumps which shall come in contact with them.

Figure 1 is a side elevation of my invention. Fig. 2 is a plan view of the same. Fig. 3 is a front view. Figs. 4, 5, 6, and 7 are detail views.

A represents the beam, B the standard, and C the handles. Secured to the handles at any suitable point is the ratchet-rod D, in which the rear end of the operating-lever E, which is provided upon the top of the beam, is made to catch. The front end of this lever is turned upward, as shown, and is slotted, so as to catch over the projection F, which extends upward from the front end of the fender bar or rod G. In the top of this rod or bar are made a suitable number of holes, so that the projection can be adjusted back and forth, according as it may be desired to move the fender a greater or less distance, either from or toward the plow. The front end of this fender rod or bar is turned upward, and then at right angles, so as to extend directly across the top of the beam, as shown, and is provided with a hanger, H, at its outer end, through which and the turned-up part of the rod is passed the pivotal rod J, upon which the fender is adjusted back and forth. This rod J, upon which the fender slides back and forth, may be held to the beam in several ways. A stirrup, L, may be passed up over the under side of the beam, and a suitable block, M, having a notch at its center to receive the rod J, and a projection extending down over each of its ends, so as to catch in the bottom, may be used, the rod J being passed through the upper ends of the stirrup. This stirrup will then be secured to the beam by means of a suitable slide having its ends notched so as to catch over the edges of the stirrup, and a set-screw which passes through the stirrup and bears against the under side of the slide, so as to regulate the distance the stirrup shall move up and down. Should it be desired, however, the block M may be dispensed with, and the pivotal rod J then catch directly upon the top of the beam, or be passed through any suitable guide which may be placed upon the top of the beam for this purpose.

In case it is desired to have a lock for the purpose of holding the fender in any position into which it may be adjusted, the block M will be dispensed with, and a block, N, having the sharp-edged projection P upon its top, will be used. This projection has its front edge cut away, as shown. This sharp edge of the block catches in the ratchet which is formed in the under side of the fender bar or rod, and serves to hold the bar in position. As this block having the sharp edge upon its top is rigidly locked upon the top of the beam by suitable projections and by the stirrup or any other suitable holding devices, the fender rod or bar will be held in place, after it has once engaged with the sharp edge of the projection upon the top of the block, until the rear end of the fender is raised upward by means of the rods, wire, or cord Q, which is attached to its rear ends. In raising the rear end of the fender upward, the fender rod or bar is made to turn upon the pivotal rod J until the ratchet is moved forward, so as to come just opposite that cut-away portion of the sharp edge of the projection, when by moving the ratchet-rod the fender can be adjusted toward either side. As soon as the rear end of the fender is allowed to drop downward, the fender-bar is pulled backward, so that the ratchet again engages with the sharp edge of the projection upon the block, and again locks the fender in position, so that it cannot move laterally. The difference between the two blocks consists in the fact that one allows the fender to be adjusted at any time, and depends upon the hold of the ratchet upon the rear end of the shifting or ratchet lever, and in the other the fender can only be shifted toward either side by raising the rear end of the fender upward, so as to tilt the fender rod or bar forward.

By means of the construction above described it will be seen that the fender can be moved either toward or away from the plow while the plow is in motion, and that without either having to stop the horse or to loosen a single nut or bolt. In this manner the distance that the earth shall be moved toward the growing plants can be regulated at the will of the operator.

In order to prevent the clods from rolling over upon and crushing the young plants, not allowing the pulverized earth to fall around them, the fender rod or bar is provided with suitable guides, R, in between which the shields or fenders T can be placed; also, secured to the outer side of the fender-bar is a suitable spring, U, which has a point or projection which passes through the bar and through corresponding holes which are made in the shields or fenders. Where the ground is heavy and sticky, a shield or fender having no openings through its lower portion may be used, and this fender will prevent the heavy sticky dirt from falling over upon the plants. When, however, the dirt is of such a nature that it is readily pulverized, two of the shields or fenders will be used together, each one having one or more slots through its lower portion. Then by adjusting either one of these fenders in relation to the other, the slots can be adjusted so that only earth of the desired size will pass through them and fall upon the plants.

In case it is not desired to slot the fenders, vertical cuts or recesses may be formed in their lower edges, and then one of the fenders will be made considerably shorter than the other, and provided with a series of holes, so that the shorter fender can be moved both up and down and back and forth, and thus regulate the size of the cuts in the lower edge of the fenders.

As the fender rod or bar can turn freely upon the pivotal rod J, and be adjusted back and forth laterally thereon, and as the rear end of the rod can be raised upward, it can readily be seen that the fenders are given an almost universal motion, so as to be raised up over any obstructions which may be in the way. By providing the fender-rod with guides, as above described, the fenders can be used in pairs, and thus the operator can regulate the fineness of the earth which he wishes to fall around the plants.

I do not limit myself to any precise construction of parts here shown, for the fender may be adjusted back and forth by somewhat different devices without departing from the spirit of my invention.

Having thus described my invention, I claim—

1. The combination of the fender rod or bar, the pivotal rod upon which it turns, a block and stirrup, and an operating rod or lever, by means of which the fender rod or bar is shifted laterally, substantially as set forth.

2. The combination of the block having the sharp-edged projection upon its top, the pivotal rod, and stirrup, with the fender rod or bar having a ratchet formed in its under side, and a rod, cord, or wire by which the rear end of the rod is raised upward, so as to move the ratcheted surface opposite the cut-away edge of the projection.

3. The combination of a fender rod or bar, provided with guides, with the fenders or shields which are placed in the guides, substantially as shown.

4. The combination of the fender rod or bar, provided with guides, with the holding-spring, and the shields or fenders which are placed in the guides, and held in any desired position by means of the spring, substantially as described.

5. The combination of a fender rod or bar, provided with holders, with two fenders or shields having openings or recesses in their lower portion, and a holding device for locking the fenders together, substantially as set forth.

6. The combination of a fender rod or bar which is pivoted at its front end upon a pivotal rod, holders, and a spring which is applied to the fender rod or bar, with perforated or recessed fenders or shields, each one of which shields or fenders is provided with a series of holes, whereby they may be adjusted in relation to each other, substantially as shown and described.

In testimony whereof I affix my signature in presence of two witnesses.

J. J. McCARTER.

Witnesses:
J. D. BOYD,
SAM. KELLY.